(12) United States Patent
van Deursen et al.

(10) Patent No.: US 6,708,857 B1
(45) Date of Patent: Mar. 23, 2004

(54) METHOD FOR CUTTING A GLASS DUCT, SUCH AS A GAS CHROMATOGRAPHY COLUMN, A GLASS FIBER, AND THE LIKE, AND DEVICE FOR PRACTICING THIS METHOD

(75) Inventors: Johannes Martinus van Deursen, Middleburg (NL); Ewie de Kuyper, Cruquius (NL)

(73) Assignee: SGT Explotitatie B.V., Middleburg (NL)

( * ) Notice: Subject to any disclaimer, the term of this patent is extended or adjusted under 35 U.S.C. 154(b) by 0 days.

(21) Appl. No.: 09/486,849

(22) PCT Filed: Sep. 7, 1998

(86) PCT No.: PCT/NL98/00513

§ 371 (c)(1), (2), (4) Date: Jun. 23, 2000

(87) PCT Pub. No.: WO99/12856

PCT Pub. Date: Mar. 18, 1999

(30) Foreign Application Priority Data

Sep. 5, 1997 (NL) .............................................. 1006961

(51) Int. Cl.[7] ............................ C03B 33/10; B26F 3/00; H02G 1/12; H01R 43/00
(52) U.S. Cl. ............................... 225/2; 225/96; 81/9.51
(58) Field of Search ............................. 225/2, 96, 96.5; 81/9.51

(56) References Cited

U.S. PATENT DOCUMENTS

| | | | | |
|---|---|---|---|---|
| 3,659,764 A | * | 5/1972 | Janiszewski | 225/2 |
| 4,084,310 A | * | 4/1978 | Dragisic | 29/564.4 |
| 4,111,346 A | * | 9/1978 | Bertolette | 225/96.5 |
| 4,203,539 A | * | 5/1980 | Miller | 225/2 |
| 4,216,004 A | * | 8/1980 | Brehm et al. | 225/2 X |
| 4,229,876 A | * | 10/1980 | Doty | 225/96.5 X |
| 4,245,537 A | * | 1/1981 | Curtis | 225/96 X |
| 4,262,417 A | * | 4/1981 | Logan et al. | 225/96 X |
| 4,411,179 A | * | 10/1983 | Stroup | 225/96 X |
| 4,424,925 A | * | 1/1984 | Rumayor-Aguirre et al. | 225/2 |
| 4,530,452 A | * | 7/1985 | Balyasny et al. | 225/96 |
| 4,621,754 A | * | 11/1986 | Long et al. | 225/96 |
| 4,627,561 A | * | 12/1986 | Balyasny et al. | 225/96 |
| 4,785,701 A | * | 11/1988 | ten Berge et al. | 225/2 X |
| 4,786,134 A | * | 11/1988 | Fort et al. | 225/96 X |
| 4,852,244 A | * | 8/1989 | Lukas | 225/96.5 X |
| 4,993,287 A | * | 2/1991 | Carpenter et al. | 81/9.51 |
| 4,999,910 A | * | 3/1991 | Cross | 81/9.51 X |
| 5,123,581 A | * | 6/1992 | Curtis et al. | 225/2 |
| 5,301,868 A | * | 4/1994 | Edwards et al. | 225/96.5 |
| 5,320,002 A | * | 6/1994 | Sayyadi et al. | 81/9.51 |
| 5,333,521 A | * | 8/1994 | Dunaenko, Jr. et al. | 81/9.51 |
| 5,350,098 A | * | 9/1994 | Oakley et al. | 225/2 |
| 5,460,311 A | * | 10/1995 | Fan | 225/96 |
| 5,501,385 A | * | 3/1996 | Halpin | 225/96 |
| 5,669,276 A | * | 9/1997 | Spacek | 81/9.51 X |
| 5,896,787 A | * | 4/1999 | DeVincentis | 81/9.51 |
| 5,937,511 A | * | 8/1999 | Hoffa et al. | 81/9.51 X |

FOREIGN PATENT DOCUMENTS

| | | |
|---|---|---|
| NL | 1004436 | 7/1998 |
| NL | 1006961 | 5/1999 |
| SU | 455921 | 2/1974 |

* cited by examiner

*Primary Examiner*—Charles Goodman
(74) *Attorney, Agent, or Firm*—Weingarten, Schurgin, Gagnebin & Lebovici LLP

(57) ABSTRACT

A method is provided for cutting a glass duct, whereby the glass duct can be cut off completely straight. In this method, the coating layer is first cut through all round at the axial location of the fiber where the fiber is to be notched before the notching and subsequent breaking off of the glass duct. To enable the use of this method for glass ducts of varying diameters, the glass duct can be retained in a fixed position during cutting, while a cutting member, as well as a counterpressure surface for the cutting member, are moved all round the glass duct. Because glass ducts of a relatively small diameter are pressed further sidewards by the cutting member than glass ducts of greater diameter, this method effectively limits this sidewards displacement to prevent the glass ducts from breaking in an unintended manner.

11 Claims, 3 Drawing Sheets

METHOD FOR CUTTING A GLASS DUCT, SUCH AS A GAS CHROMATOGRAPHY COLUMN, A GLASS FIBER, AND THE LIKE, AND DEVICE FOR PRACTICING THIS METHOD

CROSS-REFERENCE TO RELATED APPLICATIONS

This application claims priority to application No. PCT/NL98/00513 filed Sep. 7, 1998, now publication number WO 99/12856 published Mar. 18, 1999; which claims priority to NL1006961 filed Sep. 5, 1997, which are both incorporated herein by reference.

BACKGROUND OF THE INVENTION

The present invention relates to a method for cutting a glass duct, such as a gas chromatography column, a glass fiber, and the like, of which the external surface is provided with a coating layer.

Such a method is known from U.S. Pat. No. 4,852,244. This document relates to the connection of optical fibers whereby an insulating layer must be removed from the fiber over a predetermined length, whereafter a transverse score is formed in the bared fiber portion and the said fiber portion is broken.

Dutch patent application 1004496 discloses a gas chromatograph which comprises an oven with an injector and a detector, which injector and detector can be connected to each other by a capillary gas chromatography column. This gas chromatography column comprises a capillary tube of glass having an inside diameter in the order of 50 to 600 µm, which tube is provided, on the outside, with a coating, in particular a polyamide coating layer, which reduces the fragility of the tube. Such gas chromatography columns are to be replaced regularly, for instance because for measurement on one substance, a different column is used than for measurement on another substance. In the gas chromatograph such as it is described in the above Dutch patent application, to that end, use is made of coupling devices with a constriction, on one side of which a glass duct having preferably the same inside and outside diameters as those of a capillary gas chromatography column and having a fixed standardized length is fixedly connected, which glass duct reaches to the proper depth into the injector chamber of the injector and/or the detection space of the detector. To the other side of this coupling device, the removable capillary gas chromatography column can be connected. Here, it is of great importance that the gas chromatography column, when it is inserted into the constriction mentioned, is cut off completely straight. A gas chromatography column which has not been cut off straight disturbs the measuring results.

At the time of delivery, a gas chromatography column to be installed is typically protected at the end by a so-called septum, which is a rubber or plastic cap into which the end of the column is inserted. Upon removal of this cap, the end of the column can become contaminated, and particles of this septum may end up, via the column and the gas flowing through it, in the oven and be combusted there, thereby disturbing the measuring values. Although this adverse effect can be prevented by making the septum from glass, a rubber or plastic septum is still frequently used in practice. A septum-contaminated end of a gas chromatography column to be installed should be cut off. Here, too, it holds that a gas chromatography column which has not been cut off straight disturbs the measuring results.

The end of the glass duct or gas chromatography column to be inserted into the injector or into the detector can be secured therein by a clamped joint, in that a hardened steel nut, in particular a stainless steel nut, and a cone-shaped ferrule are fitted over the glass duct or gas chromatography column, whereafter the glass duct or the gas chromatography column is slid into a hardened steel cone-shaped assembly part, in particular a stainless steel assembly part, and by tightening the nut, the ferrule is pressed into the cone-shaped assembly part. The ferrule is typically made of carbon or vespel, which is a specific polymer which is capable of resisting high temperatures without releasing molecular contaminants and deforms upon tightening of the nut, thereby yielding a gas-tight seal and securement with respect to the injector or the detector. Even so, as the ferrule is fitted over the end of the glass duct or the gas chromatography column, particles of the ferrule may still contaminate the end of the glass duct or the gas chromatography column. This possibly contaminated end must therefore be cut off. In this case, too, when the cut end is inserted into the injector or the detector and the end has not been cut off completely straight, this can cause errors in the measuring results.

In cutting off the gas chromatography column or the hollow glass duct, account is to be taken of the fact that the length of the column and the glass duct, as well as the depth over which they are inserted into the injector and the detector, must have a defined value, typically a standardized value, to obtain mutually comparable measuring results.

Not only in gas chromatography columns, or similar hollow glass ducts, is it of importance that they can be cut off straight, but also in glass fibers, for instance for telecommunication purposes, this is of great importance. Such glass fibers, herein understood to be encompassed by the term 'glass duct', are formed by a solid glass core having around it a vapor-deposited glass layer of a different composition having a different refractive index, and here too, a coating, in particular a polyamide coating layer, is provided around the whole for the glass fiber to retain its strength. To provide that the end of such a glass fiber retains its optical properties undisturbed, it is of importance, here too, for this end to be cut off completely straight.

When a glass duct, in particular a gas chromatography column or a glass fiber, which is provided with a coating layer, is cut off in the manner as is known in ordinary glass cutting, the glass duct is notched and then broken off. The coating layer is thereby torn up on one side and the glass duct exhibits a frayed end, while, further, particles are released which cause contamination, especially in a gas chromatography column. Due to the presence of the coating layer which is partly torn, breaking off the glass duct is a non-controlled process, which makes it uncertain whether the glass duct has been cut off straight, nor is it known to what extent it has not been cut off straight. The result is a glass duct having non-reproducible properties, which introduces measuring errors or optical deviations, depending on the application of the glass duct.

BRIEF SUMMARY OF THE INVENTION

The object of the invention is to eliminate these disadvantages, at least to limit them to a considerable extent, and to provide a method for cutting a glass duct, whereby this glass duct can be cut off completely straight, as well as a device to enable the straight cutting operation.

To that end, the method such as it is described in the preamble is characterized, according to the invention, in that before the notching and subsequent breaking off of the glass duct, first the coating layer is cut through all round at the axial location of the fiber where the fiber is to be notched.

To enable the use of this method for glass ducts of varying diameters, the glass duct can be retained in a fixed position during cutting, while a cutting member, as well as a counterpressure surface for the cutting member, are moved all round the glass duct. Specifically the counterpressure surface is of importance here, because glass ducts having a relatively small diameter are pressed further sidewards by the cutting member than are glass ducts having a relatively great diameter, and therefore this sideway displacement should be effectively limited to prevent the glass ducts from breaking in a manner not intended.

In a more concrete method, a glass duct is inserted in an insertion passage through a housing, the glass duct being retained in a first part of the housing by clamping means, and during the cutting of at least the coating layer, a second part of the housing, which includes the cutting member and, if present, the counterpressure surface, is moved around the glass duct. In the condition of rest, the insertion passage through the housing is at least partly closed off by the cutting member, while to clear the insertion passage, the cutting member is moved against the action of a compression spring, such that a glass duct can be led through the insertion passage, whereafter the cutting member, under the action of the compression spring, presses against the inserted glass duct and, when moved around this glass duct, cuts through at least the coating layer.

To obtain a completely straight, or at least substantially completely straight cut, the device for cutting a glass duct, such as a gas chromatography column, a glass fiber, and the like, of which the external surface is provided with a coating layer, is characterized, according to the invention, in that the device comprises a housing through which a glass duct can be inserted, which housing comprises a first part with an insertion passage, which first part is provided with clamping means for clamping a glass duct inserted through the housing, and a second part with an insertion passage being aligned with the insertion passage through the first part, which second part can rotate relative to the first part substantially about the axis of the two aligned insertion passages, which second part includes a cutting member which, under spring action, presses perpendicularly against a glass duct inserted through the housing.

In a preferred embodiment, in the insertion passage of the second part of the housing, a guide bush is arranged, one end of which extends as far as, or substantially as far as, the cutting member and forms a counterpressure surface for the cutting member. In particular, this guide bush is cut slantwise, with the portion of the guide bush that continues farthest being located opposite, or substantially opposite, the cutting member.

BRIEF DESCRIPTION OF THE SEVERAL VIEWS OF THE DRAWINGS

The invention will now be further elucidated with reference to the accompanying drawings, in which.

DETAILED DESCRIPTION OF THE INVENTION

Figure 1:
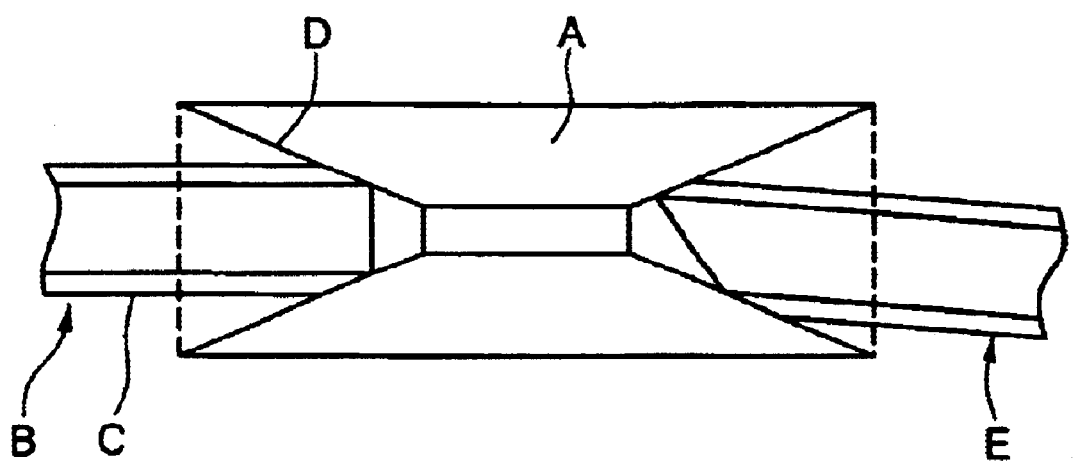
FIG. 1 shows a part of the coupling device such as it is described in Dutch patent application 1004496.

FIG. 1 represents a part A of a coupling device for glass ducts, in particular for gas chromatography columns, such as it is described in Dutch patent application 1004496. A glass duct B, cut off straight, is introduced into part A from the left-hand side, and an airtight seal can be obtained by deformation of the coating layer C against the conical inside surface D of part A of the coupling device. A glass duct E, cut slantwise, is inserted into part A from the right-hand side. Due to the cut on the bias, the surface of the section is somewhat elliptical. Consequently, when the glass duct is introduced into part A of the coupling device, it will not dig its way into part A along the centerline thereof, but assume a slightly skewed position, thereby causing a considerable risk of leakage.

Figure 2:
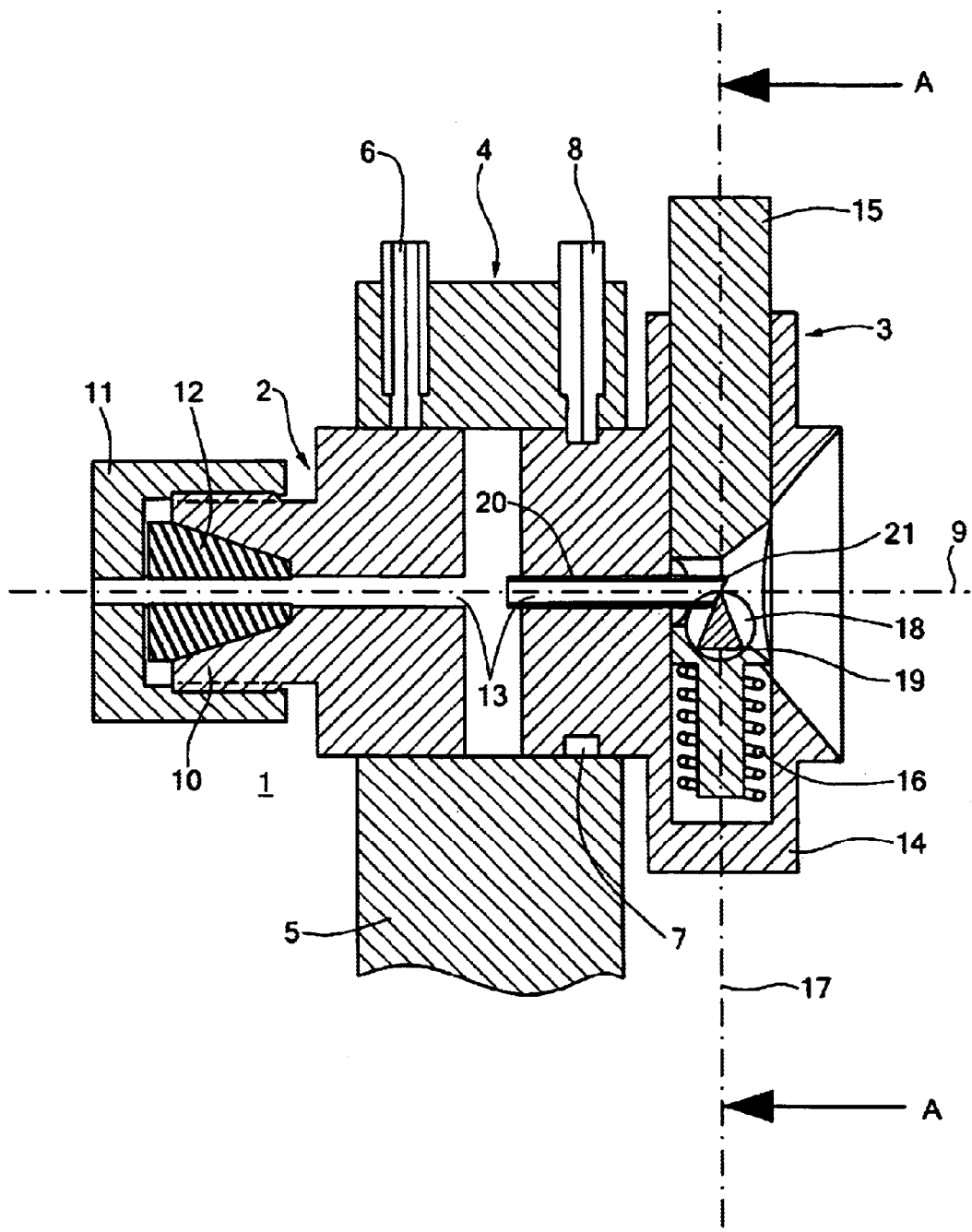
FIG. 2 is a longitudinal section of the device according to the invention.
Figure 3:
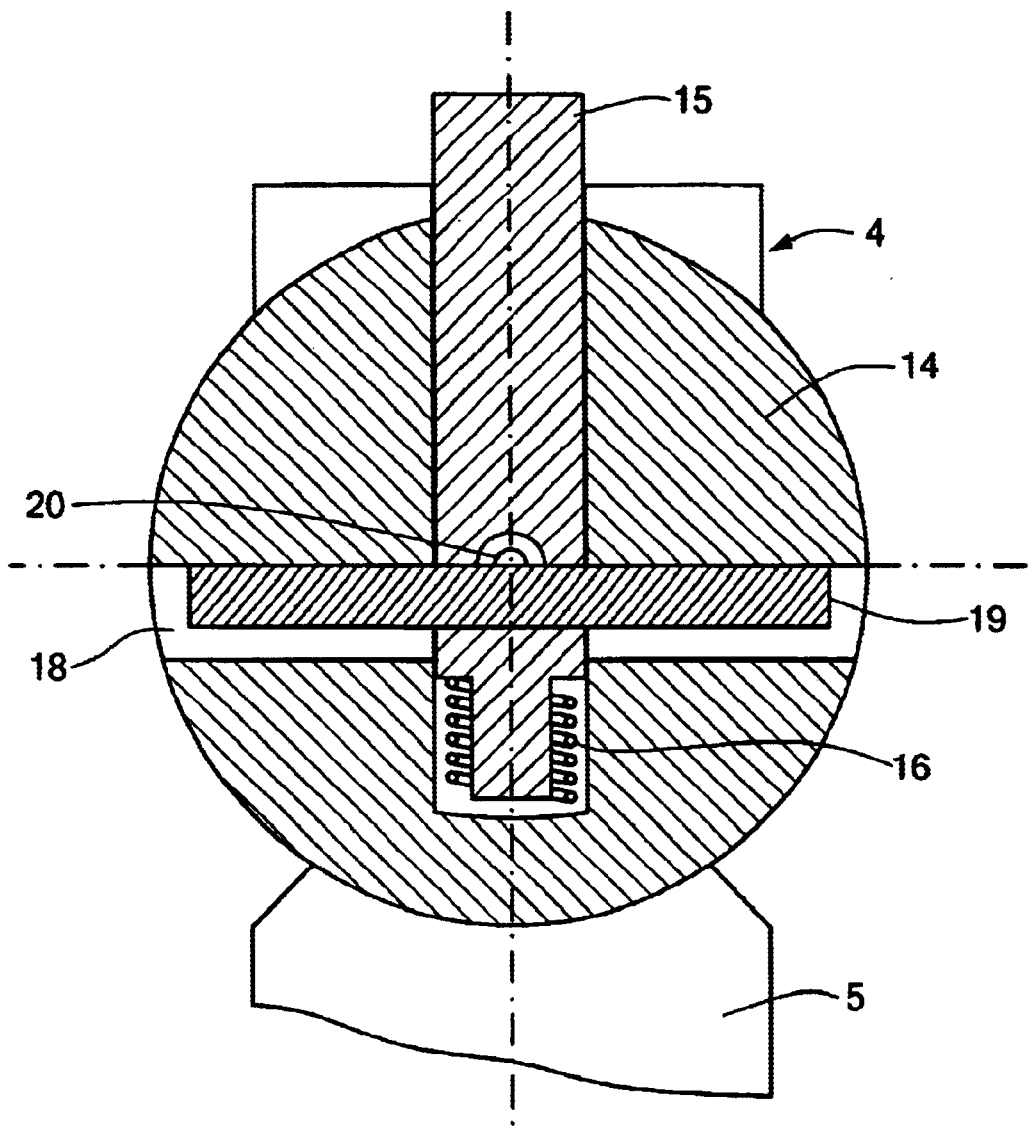
FIG. 3 is a cross-section taken on line A—A in FIG. 2.

The device shown in FIGS. 2 and 3 comprises a cylindrical housing 1, which comprises a first part 2 and a second part 3, which parts 2 and 3 are inserted through a support body 4 forming one whole with a grip 5. The first part 2 is secured in the support body 4 by a bolt 6. The second part 3 has a circumferential groove 7 in which, fixed in the supporting body 4, three locking pins have been inserted (only locking pin 8 is represented in FIG. 2) at a mutual angle of 120°, such that the second part 3, while restrained from axial movement, can rotate about the centerline 9.

The first part 2 of the housing 1 has a projecting portion 10 of a lesser diameter than that of the portion of the housing 1 that is located in the supporting body 4. Provided around this projecting portion 10 is an external thread, around which fits the inner thread of a closing bush 11. Located between the closing bush 11 and a conical recess in the projecting portion 10 is a cone-shaped clamping element 12, which is made of a slightly elastic material. Provided through the closing bush 11, the clamping element 12, the projecting portion 10, the residual portion of the first part 2 of the housing 1, and the second part 3 of the housing 1, is a bore 13 of a diameter in the order of 1 to 2 mm, which bore forms the insertion passage for a glass duct. The closing bush 11, the clamping element 12 and the projecting portion 10 jointly form the clamping means by which an inserted glass duct can be secured in the first part 2 of the housing 1.

The second part 3 of the housing 1 has a collar-shaped portion 14, projecting outside the supporting body 4, in which a bore is provided. Disposed in this bore is a pressure pin 15 with a compression spring 16 around the lower portion thereof (in FIGS. 2 and 3). This pressure pin 15 can be pushed downwards (in FIGS. 2 and 3) over a slight distance, that is, a distance in the order of 0.5 to 1 mm, against the action of the spring 16. A bore 18 is provided through the pressure pin 15, which extends perpendicularly to the plane through the centerline 17 of the pressure pin 15 and the centerline 9 of the second part 3 of the housing 1. In bore 18, a cutting member 19 in the form of a knife is arranged. This knife should have at least the same, but preferably a higher hardness than the glass of the glass duct. The glass duct in itself already possesses a high hardness in that it has been provided with a coating layer directly after drawing. The knife can be made from high-speed steel, hard metal (tungsten carbide), diamond, sapphire, silicon carbide, and like materials having a very high hardness. In the portion of the bore 13 that is located in the second part 3 of the housing 1, a guide bush 20 is provided, which continues so far in the direction of the cutting member 19, and, on the side of the cutting member 19, is cut slantwise such, that the portion of this guide bush 20 that continues farthest constitutes a counterpressure surface 21 for the cutting member 19.

The operation of the device described here is as follows:

The closing bush 11 is loosened, whereafter a glass duct is inserted through the insertion passage 13. In doing so, the pressure pin 15 is to be pushed down (in FIGS. 2 and 3) to fully clear the insertion passage 13 which is partly closed off by the cutting member 19 in the condition of rest. Once the glass duct has been fully inserted in the insertion passage 13, the pressure pin 15 is released again, and the cutting member 19 will press against the glass duct under the action of the spring 16. By then tightening the closing bush 11 again, the clamping element 12 is pressed into the conical recess of the projecting portion 10 of the first part 2 of the housing 1, to engage the inserted glass duct, thereby fixing this glass duct in the first part 2 of the housing 1. Then the second part 3 of the housing 1 with the guide bush 20 and the cutting member 19 can be rotated around the glass duct. Through the permanent pressure exerted by the cutting member 19 on the glass duct, the coating layer on the external surface of the glass duct is thereby cut through all round, while upon continued rotation, further, the glass is notched at least so far that the surface tension of the glass is broken, whereafter the glass duct can be further broken off, yielding a fractured surface extending, with extreme precision, perpendicularly to the longitudinal direction of the glass duct.

As the coating layer is being cut through and the glass is being notched, the cutting member 19 presses the glass duct against the side of the inside wall of the guide bush 20 remote from the cutting member 19, while the slantwise cut end 21 of the guide bush 20 provides the necessary counterpressure. This construction with the guide bush cut slantwise makes it possible to cut glass ducts of varying diameters perpendicularly to their longitudinal direction, since, independently of their diameter, these ducts are pressed against the inside wall of the guide bush 20 by the cutting member 19. Although the centerline of the glass duct in the guide bush 20 may thereby come to lie slightly above (in FIGS. 2 and 3) the centerline 9 of the insertion passage 13, this is not objectionable, in view of the flexibility exhibited by the glass ducts.

The invention is not limited to the embodiment described and represented here, but encompasses all possible modifications thereof, naturally insofar as they fall within the scope of protection of the following claims. Thus, instead of inserting the glass duct in FIG. 2 from the left to the right before cutting it off, as described above, it is also possible to insert the glass duct from the right to the left. In the working mode described hereinabove, the glass duct end to be used is fixed by clamping, while the cut-off portion, after breaking off, falls from the device according to the invention. If the cutting member is rotated around the clamped glass duct too long, an unduly deep notch might cause damage. By inserting the glass duct from the other side, and clamping it, the glass duct, after rotation of the cutting member, breaks off in the desired manner upon appropriate notching, which significantly reduces the risk of damage. The clamped portion of the glass duct is then discarded.

What is claimed is:

1. A method of cutting a glass duct, of which an external surface of the glass duct is provided with a coating layer, the method comprising the steps of:
    cutting the coating layer through all around at an axial location of the glass duct where the glass duct is to be notched;
    moving a cutting member and a counterpressure surface for the cutting member around the glass duct, the cutting member including a cutting part, the cutting part pressing perpendicularly against the glass duct at a first location of the glass duct, the counterpressure surface providing a counterpressure against the glass duct at a second location directly opposite the first location where the cutting part presses against the glass duct, thereby limiting a lateral displacement of the glass duct while the cutting part presses against the glass duct; and
    notching and breaking off the glass duct.

2. The method according to claim 1, wherein the glass duct is retained in a fixed position, while the cutting member, and the counterpressure surface for the cutting member, are moved around the glass duct.

3. The method according to claim 2, further comprising the steps of inserting the glass duct in an insertion passage through a housing, the glass duct being retained in a first part of the housing by a clamping device, while during the cutting of at least the coating layer, a second part of the housing, which includes the cutting member and the counterpressure surface, are moved around the glass duct.

4. The method according to claim 1, further comprising the steps of inserting the glass duct in an insertion passage through a housing, the glass duct being retained in a first cart of the housing by a clamping device, while during the cutting of at least the coating layer, a second part of the housing, which includes the cutting member and the counterpressure surface, are moved around the glass duct.

5. The method according to claim 4, wherein during a rest condition, the insertion passage through the housing is at least partly closed off by the cutting member, while to clear the insertion passage, the cutting member is moved against an action of a compression spring, such that the glass duct can be inserted through the insertion passage, whereafter the cutting member, under an action of the compression spring, presses against the inserted glass duct, and upon movement around the glass duct, the cutting member cuts through at least the coating layer.

6. A device for cutting a glass duct, of which an external surface of the glass duct is provided with a coating layer, the device comprising:
    a housing through which the glass duct can be inserted, the housing including,
        a first part with a first insertion passage, which is provided with a clamping device for clamping the glass duct inserted through the housing, and
        a second part with a second insertion passage being aligned with the first insertion passage, wherein the second part can rotate relative to the first part substantially about an axis of the first and second insertion passages, and wherein the second part includes a cutting member having a cutting part, and a counterpressure surface which is arranged directly opposite the cutting part for moving around the glass duct which, under an action of a spring, presses perpendicularly against the glass duct inserted through the housing at a first location of the glass duct, wherein the counterpressure surface provides a counterpressure against the glass duct at a second location directly opposite the first location where the cutting part presses against the glass duct, thereby limiting a lateral displacement of the glass duct while the cutting part presses against the glass duct.

7. The device according to claim 6, wherein the second insertion passage comprises a guide bush arranged to have one end extending as far as, or substantially as far as, the cutting member and to form a counterpressure surface for the cutting member.

8. The device according to claim 7, wherein the guide bush is cut slantwise, and a portion of the guide bush that continues farthest is located opposite or substantially opposite the cutting member.

9. The device according to claim 8, wherein the cutting member comprises a knife of a material having a very high hardness with respect to the glass of glass ducts to be cut, the material comprising high-speed steel, hard metal, tungsten carbide, diamond, sapphire, or silicon carbide.

10. The device according to claim 7, wherein the cutting member comprises a knife of a material having a very high hardness with respect to the glass of glass ducts to be cut, the material comprising high-speed steel, hard metal, tungsten carbide, diamond, sapphire, or silicon carbide.

11. The device according to claim 6, wherein the cutting member comprises a knife of a material having a very high hardness with respect to the glass ducts to be cut, the material comprising high-speed steel, hard metal, tungsten carbide, diamond, sapphire, or silicon carbide.

* * * * *

UNITED STATES PATENT AND TRADEMARK OFFICE
CERTIFICATE OF CORRECTION

PATENT NO. : 6,708,857 B1
DATED : March 23, 2004
INVENTOR(S) : Johannes Martinus van Deursen et al.

It is certified that error appears in the above-identified patent and that said Letters Patent is hereby corrected as shown below:

Title page,
Item [73], Assignee, "SGT Explotitatie B.V." should read -- SGT Exploitatie B.V. --; and Column 6,
Line 24, "cart" should read -- part --.

Signed and Sealed this

Eleventh Day of January, 2005

JON W. DUDAS
*Director of the United States Patent and Trademark Office*